INVENTOR.
LUDGER E. LA BRIE
BY *H. O. Clayton*
ATTORNEY.

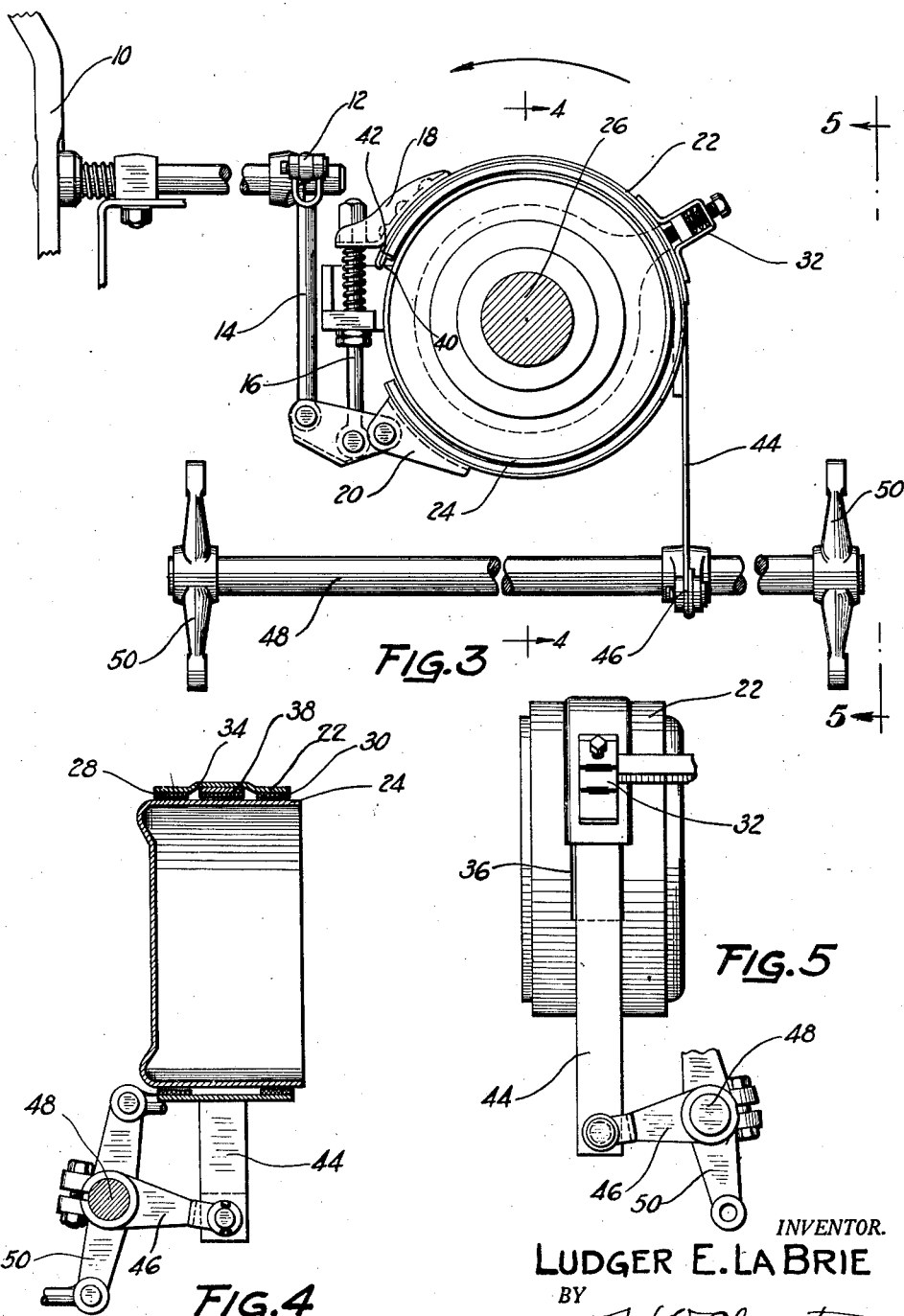

Patented Apr. 10, 1934

1,954,531

UNITED STATES PATENT OFFICE 1,954,531

BRAKE

Ludger E. La Brie, South Bend, Ind., assignor to Bendix Aviation Corporation, South Bend, Ind., a corporation of Delaware Application October 26, 1931, Serial No. 571,034

4 Claims. (Cl. 188—140)

This invention relates to brakes in general, and more particularly to that type of brake known to the trade as a "mechanical servo".

The principal object of the invention comprehends the combining of a hand operated transmission brake with a servo mechanism adapted to operate all of the four wheel brakes of the vehicle.

A further object is to provide a very simple and effective type of transmission brake adapted to brake the rear wheels of the vehicle, the friction element of said brake serving to apply a servo element, the latter applying all of the brakes of the vehicle.

Other objects of the invention and desirable details of construction will become apparent from a reading of the following description of a preferred embodiment of the invention taken in conjunction with the accompanying drawings, in which:

Figure 3 is an enlarged front elevational view of the brake mechanism of the invention;

Figure 4 is a section through the transmission brake, said section being taken on line 4—4 of Figure 3; and Figure 5 is another view of the transmission brake looking in the direction of the arrows 5—5 of Figure 3.

Figure 1:
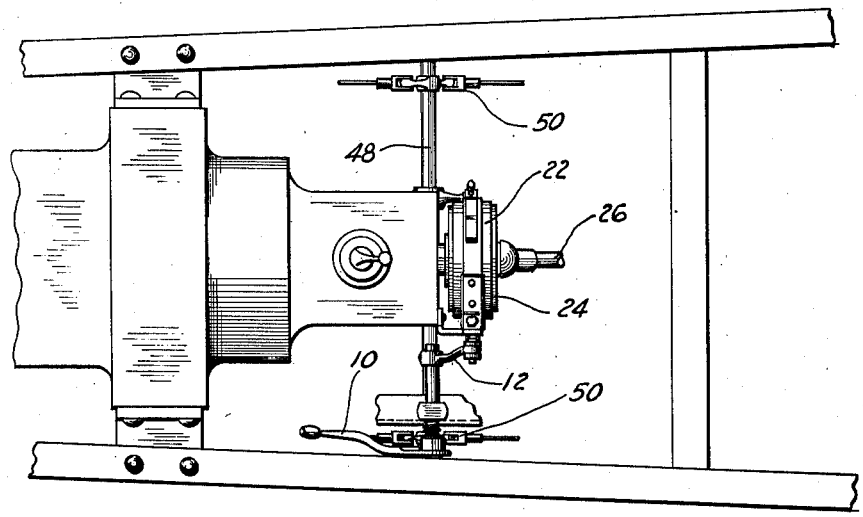
Figure 1 is a partial plan view of the vehicle chassis disclosing the essential elements of the brake mechanism constituting the invention.
Figure 2:
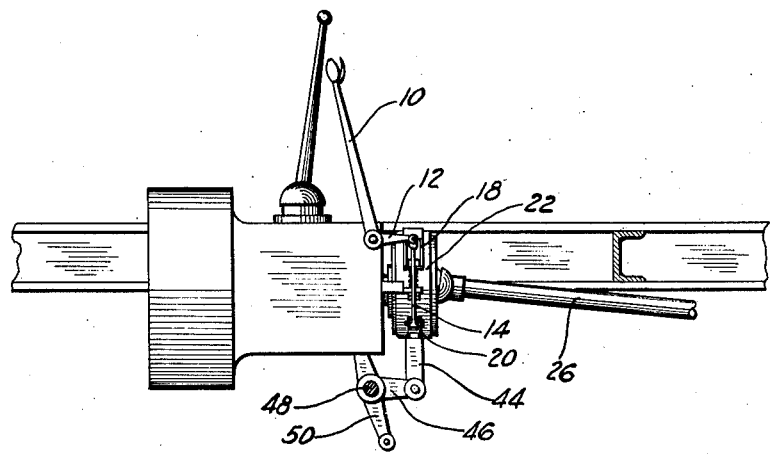
Figure 2 is a side elevational view of the mechanism of Figure 1.

In that embodiment of the invention disclosed in detail in Figures 1 and 2 there is provided a hand lever 10 adapted to actuate a crank 12 to move link 14 downwardly to apply the transmission brake, otherwise known as the emergency brake. Lever member 10 is rotated to draw a link 16 and its attached band lug 18 downwardly and also move a band lug 20 upwardly to thereby clamp a metal band 22 about a transmission brake drum 24. The drum 24 is rigidly secured to the drive shaft 26 as is the usual practice. Band 22 is provided on its under surface, Figure 4, with spaced friction elements 28 and 30 contactable with the outer face of the drum. Movement of the hand lever thus serves to apply the friction elements to the drum, retarding the car if in motion and maintaining its parked position if at rest. The torque of the band is taken by a stop 32 in the usual fashion.

The invention is particularly concerned with the incorporation of a servo brake mechanism in the aforementioned structure and to this end the band 22 is embossed at 34 and slotted at 36 to accommodate a lining covered servo band 38, return bent at its end 40 to contact the end 42 of the band 22 as a stop and provided at its other end with a strap 44 connected to a crank 46, the latter secured to a conventional rock shaft 48 having the usual two-armed crank connections 50 to the four brakes of the wheels of the vehicle.

In operation, actuation of the hand lever 10 in addition to applying the band 22, as previously described, also serves to apply the servo band 38, forcing the latter into contact with the drum. With the drum rotating counterclockwise as the vehicle is moved forward, as indicated by the arrow, Figure 3, the band 38 is also moved counterclockwise with a force which is a function of both the metal to metal coefficient of friction between 38 and 22 and the lining to metal coefficient between the lining of 38 and the drum 24. The four brakes of the vehicle are thus simultaneously applied by the servo band, which braking effect is additive of that of the band 22 operating indirectly upon the rear wheel brakes.

It will also be noted that the operation of the transmission brake in both its kinetic and static functions is independent of the operation of the servo brake.

While one illustrative embodiment has been described, it is not my intention to limit the scope of the invention to that particular embodiment, or otherwise than by the terms of the appended claims.

I claim:

1. In a braking system for vehicles a rotatable drum driven by the drive shaft of the vehicle, friction means contactable with said drum for braking the rear wheels of the vehicle, means for applying said friction means to the drum, other friction means contactable with said drum and adapted to render operative certain of the brakes of the vehicle, said last mentioned friction means being applied to said drum by said first mentioned friction means, by virtue of their frictional contact one with another there being no positive connection between said parts.

2. In a braking system for an automotive vehicle provided with a drive shaft, a drum secured to said shaft and brakes on the four wheels of the vehicle, a hand operated friction means contactable with said drum, said means serving both as a kinetic and as a static braking medium and a second servo friction means also contactable with said drum, said latter means being housed within and supported by said first mentioned friction means but having no positive connection therewith.

3. In a braking system for an automotive vehicle provided with a drive shaft, a drum secured to said shaft and brakes on the four wheels of the vehicle, a hand operated friction means contactable with said drum, said means serving both as a kinetic and as a static braking medium and a second servo friction means also contactable with said drum, said first mentioned friction means being provided with an embossed recess extending throughout a portion of its length, said recess adapted to house and support the second mentioned friction means.

4. In a braking system for an automotive vehicle provided with a plurality of brake mechanisms, a rotor brake member operably connected with one of the wheels of the vehicle, friction means contactable with said rotor member, and a second friction means also contactable with said rotor member, said latter friction means being housed within and supported by said first mentioned friction means but having no positive connection therewith.

LUDGER E. LA BRIE.